United States Patent
Harker (10) Patent No.: US 6,202,263 B1
(45) Date of Patent: Mar. 20, 2001

(54) SAFETY SLEEVE ELASTIC DEVICE (76) Inventor: Shon Les Harker, 1425 S. 2469 West, Syracuse, UT (US) 84075

( * ) Notice: Subject to any disclaimer, the term of this patent is extended or adjusted under 35 U.S.C. 154(b) by 0 days.

(21) Appl. No.: 09/353,533

(22) Filed: Jul. 14, 1999

Related U.S. Application Data (60) Provisional application No. 60/093,020, filed on Jul. 16, 1998.

(51) Int. Cl.7 .............................. A44B 13/02; F16G 11/00
(52) U.S. Cl. .............................. 24/300; 24/715.3; 24/482; 114/230; 2/237
(58) Field of Search ................................. 24/300, 715.3, 24/482; 2/237

(56) References Cited

U.S. PATENT DOCUMENTS

| | | | |
|---|---|---|---|
| 2,820,269 | * | 1/1958 | Wolff ........................ 24/300 |
| 4,559,677 | * | 12/1985 | Tracy ........................ 24/300 |
| 4,653,422 | * | 3/1987 | Allen ........................ 24/300 |
| 4,694,541 | * | 9/1987 | Skyba ....................... 24/300 |
| 4,817,551 | * | 4/1989 | Matson .................... 114/230 |
| 5,317,788 | * | 6/1994 | Esposito et al. ........... 24/300 |
| 5,546,639 | * | 8/1996 | Lacore et al. ............. 24/300 |
| 5,638,584 | * | 6/1997 | De Anfrasio .............. 24/300 |
| 5,816,458 | * | 10/1998 | Yonenoi .................... 24/300 |
| 6,085,628 | * | 7/2000 | Street et al. ................... 87/7 |

* cited by examiner

*Primary Examiner*—Victor N. Sakran
(74) *Attorney, Agent, or Firm*—Madson & Metcalf (57) ABSTRACT

The present invention provides a unique safety sleeve elastic device having an elastic member of a certain longitudinal length. The elastic member provides stretching capability of up to seven times the elastic member's original length depending on the material selected. A flexible sleeve member is disposed around the elastic member. The sleeve member is less elastic than the elastic member and provides a stretch limitation to the elastic member to prevent a user from stretching the elastic member beyond a safe elongation. The ends of the sleeve and elastic members are secured proximate to one another. The ends of the elastic members are further secured to connectors. The elastic member provides stretch capability while the sleeve member provides safety features to protect the elastic member and the user.

17 Claims, 4 Drawing Sheets

SAFETY SLEEVE ELASTIC DEVICE

RELATED APPLICATION

This application claims priority to Provisional Patent Application Serial No. 60/093,020, filed Jul. 16, 1998.

BACKGROUND

1. The Field of the Invention

The present invention relates to a stretchable device for use in a variety of applications including physical exercise.

2. The Background Art

Stretchable members have numerous applications for use in fastening, bundling, and otherwise generally containing objects. The stretch ability of such members makes them ideal for such purposes. Stretchable members also have application in exercising. The durability and stretch resistance of certain stretchable members makes them ideal for repetitive movements required in exercising.

One common stretchable member known in the art is the bungee cord. A typical bungee cord is comprised of multiple stretchable rubber fibers or strands throughout the center. A fabric is then woven around the rubber fibers. During manufacture of a bungee cord, the elastic strands are pulled through a loom that weaves the external fabric around it. Without the exterior fabric the elastic strands would fall out. The exterior fabric stays in full contact with the interior rubber fibers at all times during the stretch.

Because of the manufacturing techniques, the internal material used, and the weave of the external fabric, the bungee cord technology has limits. In practice, the maximum stretch of a bungee cord is about twice its original length. In practice, a bungee cord generally has a maximum stretch of only 1.5 to 1.75 times its original length.

Another stretchable member known in the art incorporates an elastic within an elastic. In this approach, a small tubular elastic is threaded through an identical but larger tubular elastic. Both elastics are commonly of the same material. If one elastic or the other were to break it would keep both elastics contained together. However, the use of two members of the same material does not substantially limit the stretch. Thus, the members are susceptible to stretching beyond a safe limit. This may result in breaking of the members and possible injury to the user.

Another approach in the art is the use of an elastic and rope in combination. In this approach, an elastic has a rope spiraled along the exterior length of the elastic. The rope is then attached to the eyelets at the end of the elastic. A disadvantage with this approach is the entanglement of the rope which hinders the function of the stretchable member. A further disadvantage is that if the elastic breaks the user may be injured by the whiplash of the elastic.

The prior art suffers from having limited stretching capability and not having a safety limitation to prevent undue stretching. Thus, it is an object of the invention to provide a stretching device with superior stretching capability and safety features to protect the device and the user. These advantages of the present invention will become more fully apparent by examination of the following description of the preferred embodiments and the accompanying drawings.

BRIEF SUMMARY OF THE INVENTION

The present invention provides a unique safety sleeve elastic device having an elastic, elastic member of a certain longitudinal length. The elastic member is preferably formed of a latex material, but one of skill in the art will appreciate that other elastic materials may be used as well. The invention further comprises a flexible sleeve member disposed around the elastic member. The sleeve member is less elastic than the elastic member and may be formed of polypropylene and nylon materials. The ends of the sleeve member and the ends of the elastic member are secured proximate to one another.

The ends of the elastic member and the sleeve member are secured to connectors. The connectors come in various embodiments and include clips, rings, hooks, buckles, and so forth to enable connection of the safety sleeve elastic device. Thus embodied, the safety sleeve elastic device may serve various functions including numerous applications for exercising.

The elastic member and the sleeve member act on one another to achieve the features of the present invention. The elastic member provides stretching capability of up to seven times the elastic member's original length depending on the material selected. The sleeve member has less elasticity, and may in fact have little or no elasticity, to provide a maximum allowable stretch limit. Thus, a user is prevented from stretching the elastic member beyond a safe elongation.

The sleeve member acts to protects the elastic member from wear and contact which may damage the elastic member. The sleeve member protects a user by retaining the elastic member within is interior. Thus, if the elastic member breaks a user is not harmed by whiplash. Furthermore, skin irritation from the material of the elastic member is eliminated.

Thus, it is an object of the present invention to provide a stretchable device suitable for repetitive exercises having superior stretch capability while incorporating safety features to protect the device and the user.

Such a device is disclosed and claimed herein.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

The presently preferred embodiments of the present invention will be best understood by reference to FIGS. 1 through 13 wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 13, is not intended to limit the scope of the invention, as claimed, but is merely representative of presently preferred embodiments of the invention.

Figure 1:
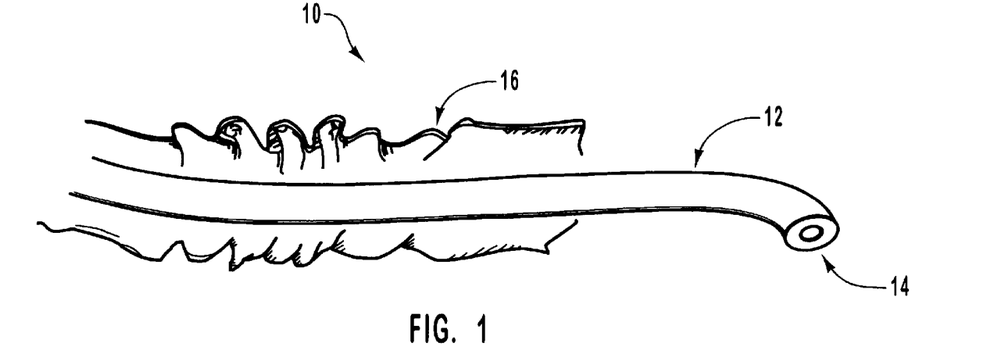
FIG. 1 is partial cross-sectional view of one presently preferred embodiment of the safety sleeve elastic device of the present invention.

In one presently preferred embodiment as shown in FIG. 1, the safety sleeve elastic device is shown and generally designated as 10. The device 10 comprises a flexible, stretchable elastic member 12. The elastic member 12 is configured to have a certain longitudinal length and first and second ends. In one embodiment, the elastic member 12 is configured in a tubular shape having an inner cavity 14 which traverses the longitudinal length of the elastic member 12.

The elastic member 12 is formed of an elastic material which is defined herein as a material which is capable of returning to an original length or shape after being stretched. In one embodiment, the elastic material comprises latex. In such an embodiment, the elastic member 12 may have a stretch of up to seven times its original length. Latex materials have great elongation abilities with a material memory that allows it to return to nearly its original length even after repetitive use. Such capability is advantageous for exercise equipment.

In alternative embodiments, the elastic material may comprise non-latex materials including natural rubber. Such alternative materials may be sufficient provided that they are capable of stretch and retraction. However, generally such materials do not provide for the superior stretch afforded by latex based materials.

The device 10 further comprises a sleeve member 16 which is hollow along its longitudinal length to surround or nearly surround the elastic member 12 along the longitudinal length of the device 10. The sleeve member 16 loosely fits around the elastic member 12 to allow the elastic member 12 to expand or contract within the sleeve member 16. The sleeve member 16 is sufficiently flexible to allow the elastic member 12 to bend.

The sleeve member 16 is further configured to be less elastic than the elastic member 12 and therefore does not stretch as far as the elastic member 12. The sleeve member 16 may provide some stretch based on the materials forming the sleeve member 16. In one embodiment, the sleeve member 16 may comprise a fabric formed of polypropylene or nylon fibers. The fibers may be assembled in a weave pattern. In such an embodiment, the weave pattern itself allows for some stretch. In one embodiment, the sleeve member 16 is formed of a fabric which provides little or no stretch.

The sleeve member 16 is preferably of a stronger material than the elastic member 12, such as the previously mentioned polypropylene or nylon materials. The ends of the sleeve member 16 are secured proximate to the ends of the elastic member 12. In one embodiment, this is done by attaching the ends of the sleeve member 16 to the elastic member 12 at or near corresponding ends of the elastic member 12. So embodied, the sleeve member 16 provides a stretch limitation to the elastic member 12. Thus, the elastic member 12 is protected from stretching beyond a breaking limit.

In one embodiment, the sleeve member 16, has a greater longitudinal length than the elastic member 12. When the elastic member 12 is at rest, the sleeve member 16 is compressed so that it terminates generally at the same ends of the elastic member 12. The elastic member 12 may be stretched until the sleeve member 16 extends to its full longitudinal length. When the sleeve member 16 extends to its full length the sleeve member 16 begins to restrict the stretch of the elastic member 12. The sleeve member 16 is selected of a certain length and material to allow stretching of the elastic member 12 to lengths appropriate for the elastic member 12. Thus, the device 10 may be stretched up to seven times its original length based on the capability of the elastic member 12.

The sleeve member 16 protects the elastic member 12 by covering the elastic member 12 and preventing contact with the elastic member 12. The elastic member 12 is preferably formed of a relatively soft material which is susceptible to damage. Exercise equipment is often exposed to rough surfaces and it is advantageous to provide such protection to the equipment.

The sleeve member 16 further protects a user from exposure to the elastic member 12. Latex may cause skin irritation. Thus, with the sleeve member 16 the user does not have direct contact with the elastic member 12.

Figure 2:
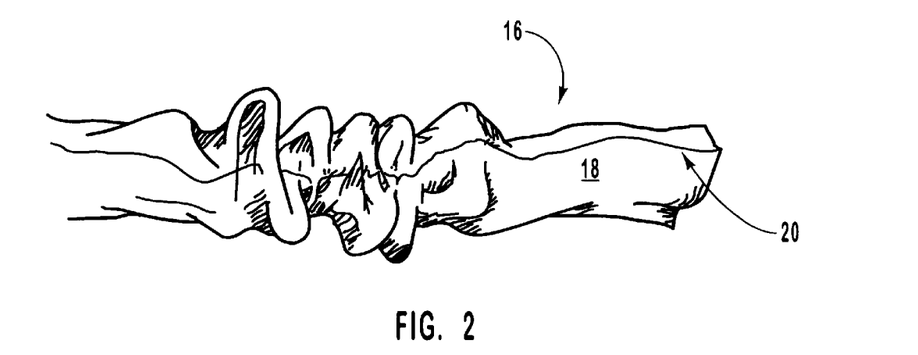
FIG. 2 is a perspective view of one embodiment of the sleeve member of the safety sleeve elastic device of the resent invention.

Referring to FIG. 2, one embodiment for the sleeve member 16 is shown. In this embodiment, the sleeve member 16 is made of a thin material such as a fabric 18. The fabric 18 may comprise fibers of polypropylene or nylon. The fabric 18 of the sleeve member 16 may be formed with a seam 20 to thereby form a cylindrical shape for housing the elastic member 12. The seam 20 may be formed by sewing, applying adhesives, or by a heat seal. Thus embodied, the sleeve member 16 may be compressed to partially fold onto itself.

Figure 3:
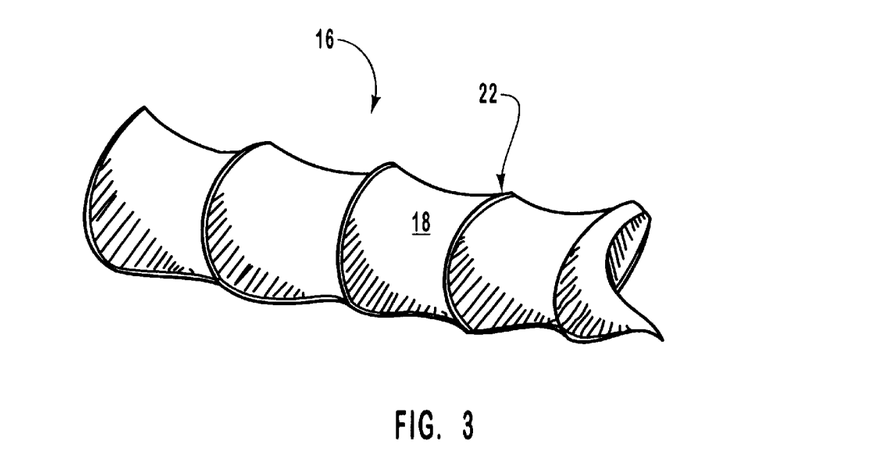
FIG. 3 is perspective view of an alternative embodiment of the sleeve member of the safety sleeve elasticdevice of the present invention.

Referring to FIG. 3, an alternative embodiment for the sleeve member 16 is shown. The sleeve member 16 comprises a spiral member 22, such as a wire, that extends substantially along the longitudinal length of the sleeve member 16 and provides reinforcement to a the fabric 18. The spiral member 22 may be compressed or extended to a certain length. The sleeve member 16 of this embodiment will still limit the stretch of the elastic member 12 because of the limited stretch of the fabric. This embodiment of the sleeve member 16 is similar to conventional clothes dryer connectors.

Figure 4A:
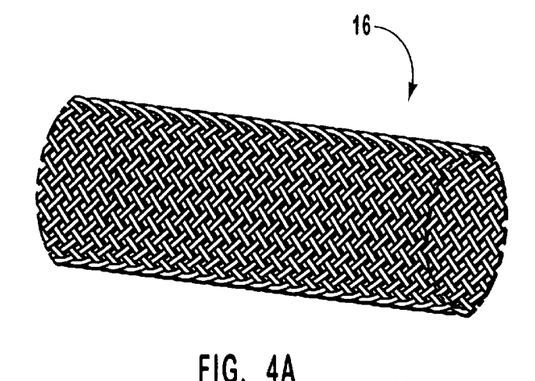
FIG. 4A is a perspective view of an alternative embodiment of the sleeve member of the safety sleeve elastic device of the present invention.
Figure 4B:
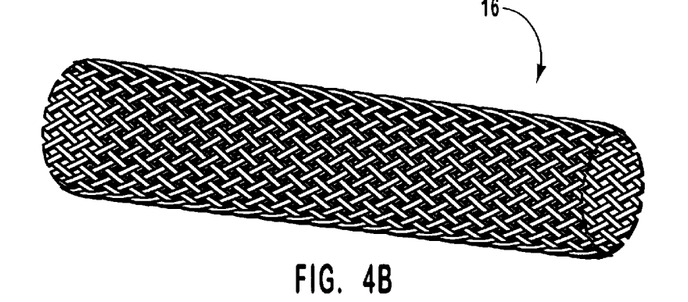
FIG. 4B is a perspective view of the sleeve member of the embodiment of FIG. 4A.

Referring to FIGS. 4A and 4B, an embodiment for the sleeve member 16 is shown. In this embodiment, the sleeve member 16 is formed of fibers weaved to allow the material to expand or contract. Accordingly, the sleeve member 16 has some stretch capability but not as much as the elastic member 12. The embodiment of FIG. 4 is similar in concept to the bungee cord fabric exteriors, Chinese thumb handcuffs, and some wire cable protection coatings.

The device 10 of the present invention may be used with end attachments or connectors. The elastic member 12 and sleeve member 16 are configured to generally terminate at these end attachments. Preferably, a connector is used for each end of the elastic and sleeve members 12, 16. Various embodiments for end attachments may be used with the device and include rings, clips, fasteners, and may be made of plastic or metal. In one embodiment, the ends of the sleeve member 16 are secured to the connectors. The ends of the elastic member 12 are then secured to the connectors and the sleeve member 16 provides a stretch limitation to the elastic member 12.

Figure 5:
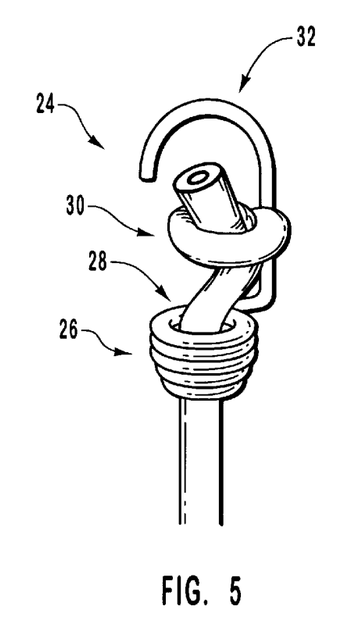
FIG. 5 is a perspective view of one embodiment of an end attachment of the safety sleeve elastic device of the present invention.

Referring to FIG. 5, one embodiment for an end attachment of connector 24 is shown and is referred to herein as a "knot." The connector 24 comprises a base 26 having an eye or aperture 28. The elastic member 12 passes through the eye 28. The elastic member 12 is tied into a knot 30. The knot 30 has a cross-section larger than the eye 28 to prevent pull back through the eye 28 of the connector 24.

The connector 24 further comprises an attachment member 32 to enable connection to another object. The attachment member 32 may be a hook as shown in FIG. 5 or may be embodied as a ring, clip, buckle, or other fastener.

The sleeve member 16 (not shown) may also pass through the eye 28 to thereby secure the sleeve member 16 as well. Alternatively, the end of the sleeve member 16 may be secured to the connector 24 by wrapping, tying, sewing, or using adhesives.

Figure 6:
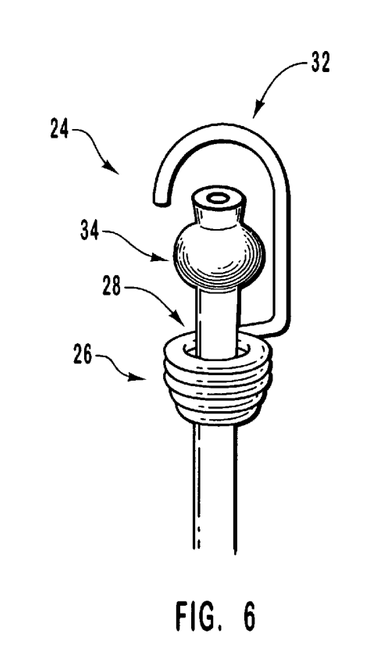
FIG. 6 is a perspective view of an alternative embodiment of the end attachment of the safety sleeve elastic device of the present invention.

Referring to FIG. 6, an alternative embodiment for a connector 24 is shown which is herein referenced to herein as a "crimp." This technique is similar to the knot in FIG. 5 except that a rigid collar 34 is employed. The rigid collar 34 crimps around the elastic member 12 after the member 12 has passed through the eye 28. The collar 34 has an outer diameter greater than that of the aperture 28 to prevent pull back of the members 12.

The sleeve member 16 (not shown) may also pass through the eye 28 and be secured with the rigid collar 34. Alternatively, the end of the sleeve member 16 may be secured to the connector 24 by wrapping, tying, sewing, or using adhesives.

Figure 7:
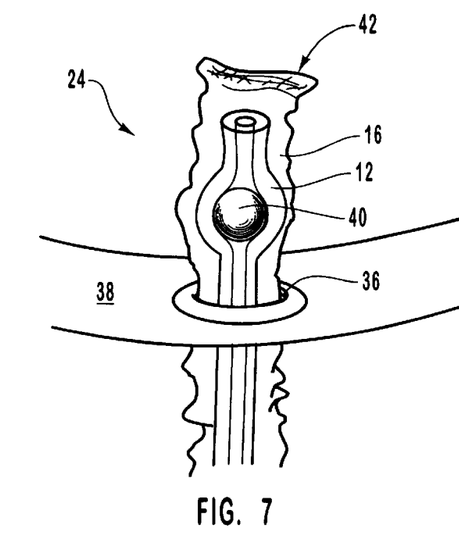
FIG. 7 is a perspective view of an alternative embodiment of the end attachment of the safety sleeve elastic device of the present invention.
Figure 8:
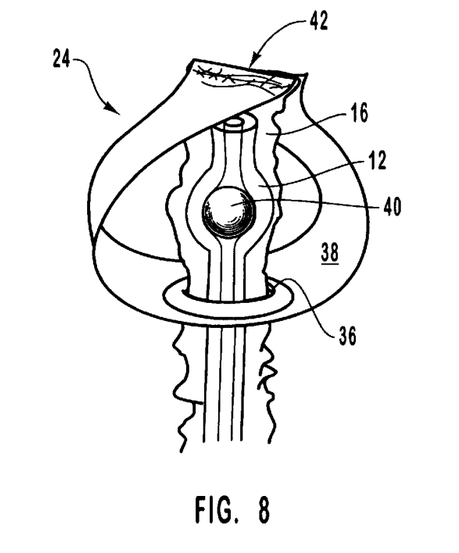
FIG. 8 is a perspective view of the end attachment of the embodiment of FIG. 7.

Referring to FIGS. 7 and 8, an alternative embodiment for a connector 24 is shown. In this embodiment, the elastic member 12 passes through an eyelet or aperture 36 of an end member 38. The end member 38 may be embodied as a strap of fabric. A rigid object 40, such as a ball, is pressed inside the elastic member 12 as shown. The rigid object's diameter 40 is greater than the diameter of the inner cavity 14 of the elastic member 12. The elastic member 12 has a greater diameter at the location of the rigid object 40 than the aperture 36 and can no longer pass through the aperture 36 in one direction.

The sleeve member 16 also passes through the aperture 36 along with the elastic member 12. The sleeve member 16 is shown connected together at its end 42 above the aperture 36 so that the rigid object 40 and the elastic member 12 together impede the sleeve member 16 from pulling through the aperture 36. Opposing ends of the end member 38 may be connected to one another at the end 42 of the sleeve member 16 to thereby secure the end member 38.

Figure 9:
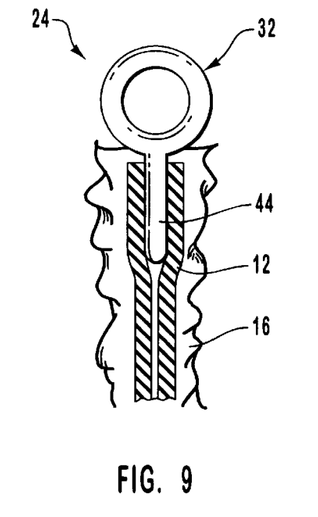
FIG. 9 is a side view of an alternative embodiment of the end attachment of the safety sleeve elastic device of the present invention.

Referring to FIG. 9, an alternative embodiment for a connector 24 is shown and is referred to herein as a "tie-on." In this embodiment, the connector 24 comprises a base member 44 such as a stem or shaft. The base member 44 is attached to an attachment member 32 such as a hook or ring. The base member 44 and attachment member 32 may be incorporated into one integral piece. The base member 44 has a diameter greater than the inner cavity 14 of the elastic member 12. The base member 44 is pressed into the inner cavity 14 and the resulting tension holds the base member 44 in place. The sleeve member 16 is then wrapped, tied, or sewn around the connector 24 to secure the sleeve member 16.

Figure 10:
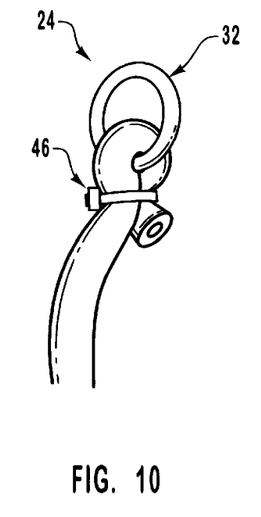
FIG. 10 is a perspective view of an alternative embodiment of the end attachment of the safety sleeve elastic device of the present invention

Referring to FIG. 10, an alternative embodiment for a connector 24 is shown and is referred to herein as a "synch tie." In this embodiment, the elastic member 12 passes through an attachment member 32 such as a ring. A clamp 46, such as a metal crimp, is secured to one end of the elastic member 12. The clamp 46 is also secured to another portion of the elastic member 12 as shown in FIG. 10 to thereby secure the connection to the attachment member 32. The sleeve member 16 (not shown) may be secured to the connector 24 by wrapping, tying, sewing, or by use of adhesives.

Figure 11:
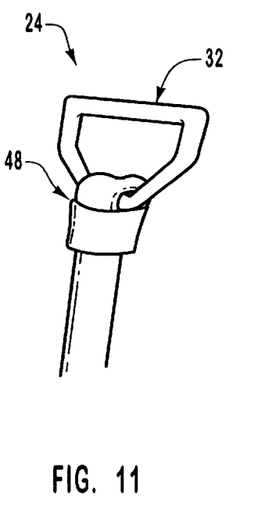
FIG. 11 is a perspective view of an alternative embodiment of the end attachment of the safety sleeve elastic device of the present invention.

Referring to FIG. 11, an alternative embodiment for a connector 24 is shown and is referred to herein as a "tuck in." In this embodiment, an aperture 48 is formed in the elastic member 12 proximate to an end of the elastic member 12. The elastic member 12 passes through the attachment member 32 and is then threaded into the aperture 48 to thereby form a lasso around the attachment member 32. The sleeve member 16 (not shown) may be secured to the connector 24 by wrapping, tying, sewing, or by use of adhesives.

Figure 12:
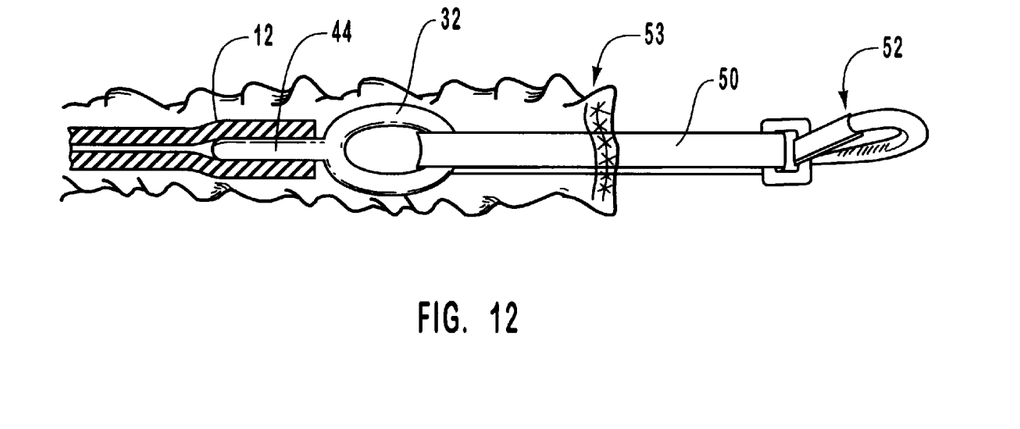
FIG. 12 is a perspective view of an alternative embodiment of the end attachment of the safety sleeve elastic device of the present invention.

Referring to FIG. 12, an alternative embodiment for a connector 24 is shown and is referred to herein as a "strap extension." This embodiment utilizes a base member 44 disposed within the inner cavity 14 as in the "tie-on" embodiment. As shown, a strap 50 is then secured to the attachment member 32. A second attachment member 52 is then secured to the strap 50. The sleeve member 16 may then be wrapped, tied, sewn, or glued to the strap 50. An advantage of this embodiment is that when the sleeve member 16 and the elastic member 12 reach their stretch limit, the force at the end 53 of the sleeve member 16 transfers to the strap 50 and then to the second attachment member 52. Thus, the attachment member 32 connected to the elastic member 12 need not be as strong as the second attachment member 52.

Figure 13:
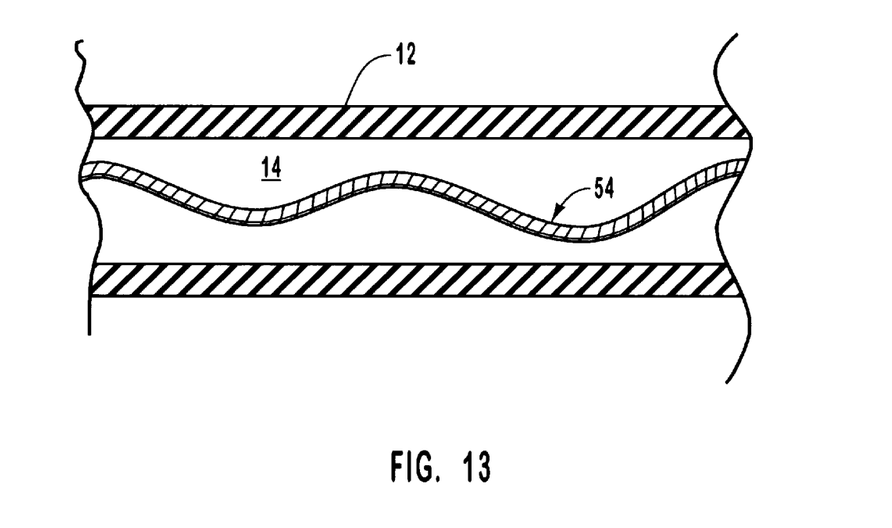
FIG. 13 is a side view of an alternative embodiment of the safety sleeve elastic device of the present invention.

Referring to FIG. 13, an alternative embodiment for the device 10 is shown. In this embodiment, the elastic member 12 is embodied as a latex or rubber tube. The elastic member 12 has an inner cavity 14 running along the longitudinal length of the member 12 as in previous embodiments. An inner member 54 is disposed within the inner cavity 14. The inner member 54 has less elasticity than the elastic member 12. In one embodiment, the inner member 54 may be embodied as a rope or string.

The inner member 54 is secured at both ends proximate to the ends of the elastic member 12. The inner member 54 may also have a greater longitudinal length than the elastic member 12. The inner member 54 provides the stretchable limitation to the elastic member 12. Obviously the embodiment of FIG. 11 does not provide the same protection of the elastic member 12 as in the embodiment of FIG. 1.

The safety sleeve elastic device 10 of the present invention is unique in that it primarily comprises two independent members 12, 16 of different materials which act upon one another. The elastic member 12 provides stretching capability in excess of 1.25 times to twice or even up to seven times the elastic member's 12 original length depending on the material selected. The sleeve member 16 provides a maximum allowable stretch limit. Often times a user will stretch an elastic member beyond a safe elongation because there is no limitation factor. When this is done, the elastic member may break and possibly injure the user. The sleeve member 16 provides added safety in that even if the elastic member 12 were to break, the elastic member 12 would retract while staying within the interior of the sleeve member 16.

The safety sleeve elastic device 10 provides elastic durability of the elastic member 12. The sleeve member 16 protects the elastic member 12 from wear and contact with sharp or rough objects which may damage the elastic member 12. Furthermore, the sleeve member 16 protects the elastic member 12 from sunlight. Sunlight increases the rate of latex deterioration. The sleeve member 16 further protects a user's skin from irritation from the material of the elastic member 12, such as latex.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive of the scope of the invention.

What is claimed and desired to be secured by united states letters patent is:

1. A stretchable apparatus, comprising:
    an elastic member having first and second ends and configured to have a stretch of at least twice an original length;
    a flexible sleeve member having first and second ends and disposed around the elastic member in a loose-fitting configuration, wherein the sleeve member is configured with an elasticity less than the elastic member to thereby provide a stretch limitation to the elastic member; and
    first and second connectors secured to corresponding first and second ends of the elastic member, the first and second connectors further secured to corresponding first and second ends of the sleeve member.

2. The apparatus of claim 1 wherein the elastic member comprises latex.

3. The apparatus of claim 1 wherein the sleeve member comprises polypropylene fibers.

4. The apparatus of claim 1 wherein the sleeve member comprises nylon fibers.

5. The apparatus of claim 1 wherein the sleeve member comprises a spiral member disposed substantially along the longitudinal length of the sleeve member.

6. The apparatus of claim 1 wherein the first connector comprises a base having an aperture through which the elastic member passes, wherein the first end of the elastic member is configured into a knot having a cross-section larger than the aperture to thereby prevent passage of the knot through the aperture.

7. The apparatus of claim 1 wherein the first connector comprises:
    a base having an aperture through which the elastic member passes; and
    a collar disposed around the elastic member and having a diameter larger than the aperture to thereby prevent passage of the collar through the aperture.

8. The apparatus of claim 1 wherein the first connector comprises:
    a rigid object disposed within the elastic member proximate to the first end of the elastic member, wherein the rigid object has a diameter greater than an internal diameter of the elastic member; and
    an end member having an aperture through which the elastic member passes, wherein the diameter of the elastic member at the location of the rigid object is greater than the aperture to thereby prevent passage of the rigid object through the aperture.

9. The apparatus of claim 1 wherein the first connector comprises:
    a base member at least partially disposed within the elastic member proximate to the first end of the elastic member, wherein the base member has a diameter greater than an internal diameter of the elastic member; and
    an attachment member connected to the base member.

10. The apparatus of claim 1 wherein the first connector comprises:
    an attachment member, wherein the first end of the elastic member extends around a portion of the attachment member; and
    a clamp secured to the first end of the elastic member to thereby secure the connection of the elastic member to the attachment member.

11. The apparatus of claim 1 wherein the first connector comprises an attachment member, wherein the first end of the elastic member extends around a portion of the attachment member, and wherein the elastic member is configured with an aperture proximate to the first end, the elastic member further configured to thread through the aperture to thereby secure the connection of the elastic member to the attachment member.

12. The apparatus of claim 1 wherein the first connector comprises:
    a base member at least partially disposed within the elastic member proximate to the first end of the elastic member, wherein the base member has a diameter greater than an internal diameter of the elastic member;
    a first attachment member connected to the base member;
    a strap having first and second ends, wherein the first end of the strap is secured to the first attachment member; and
    a second attachment member is secured to the second end of the strap.

13. A method for producing a stretchable apparatus, comprising:
    providing an elastic member having first and second ends and configured to have a stretch of at least twice an original length;
    disposing a loose-fitting, flexible sleeve member having first and second ends around the elastic member, wherein the sleeve member has an elasticity less than the elastic member to thereby provide a stretch limitation;
    securing first and second connectors to the respective first and second ends of the elastic member; and securing the first and second ends of the sleeve member to the first and second connectors.

14. The method of claim 13 wherein the step of securing the first and second connectors comprises:

providing an aperture in the first and second connectors; and passing the elastic member through the apertures in the first and second connectors.

15. The method of claim 13 wherein the step of securing the first and second connectors comprises inserting a portion of the first and second connectors into the interior of the elastic member.

16. A stretchable apparatus, comprising:

an elastic member having first and second ends and configured to have a stretch of at least twice an original length;

a flexible sleeve member having first and second ends and disposed around the elastic member in a loose-fitting configuration, wherein the sleeve member is configured with an elasticity less than the elastic member to thereby provide a stretch limitation to the elastic member, the first and second ends of the sleeve member secured to the elastic member proximate to the corresponding first and second ends of the elastic member; and first and second connectors secured to corresponding first and second ends of the elastic member.

17. A method for producing a stretchable apparatus, comprising:

providing an elastic member having first and second ends and configured to have a stretch of at least twice an original length;

disposing a loose-fitting, flexible sleeve member having first and second ends around the elastic member, wherein the sleeve member has an elasticity less than the elastic member to thereby provide a stretch limitation;

securing the first and second ends of the sleeve member to the elastic member proximate to the corresponding first and second ends of the elastic member; and securing first and second connectors to the respective first and second ends of the elastic member.

* * * * *

(12) EX PARTE REEXAMINATION CERTIFICATE (5307th)
United States Patent
Harker (10) Number: US 6,202,263 C1
(45) Certificate Issued: Mar. 21, 2006

(54) SAFETY SLEEVE ELASTIC DEVICE (75) Inventor: Shon Les Harker, Syracuse, UT (US)

(73) Assignee: Hark'n Technologies, Ltd., Clearfield, UT (US)

Reexamination Request:
No. 90/006,153, Nov. 30, 2001

Reexamination Certificate for:
Patent No.: 6,202,263
Issued: Mar. 20, 2001
Appl. No.: 09/353,533
Filed: Jul. 14, 1999

Related U.S. Application Data

(60) Provisional application No. 60/093,020, filed on Jul. 16, 1998.

(51) Int. Cl.
*A44B 13/02* (2006.01)
*F16G 11/00* (2006.01)

(52) U.S. Cl. .................. 24/300; 24/715.3; 24/482; 114/230.2; 2/237

(58) Field of Classification Search .......... 24/300, 24/715.3, 482; 482/121–131; 114/230.1, 114/230; 2/237
See application file for complete search history.

(56) References Cited

U.S. PATENT DOCUMENTS

| 2,820,269 | A | | 1/1958 | Wolff |
| 4,559,677 | A | | 12/1985 | Tracy |
| 4,653,422 | A | | 3/1987 | Allen |
| 4,694,541 | A | | 9/1987 | Skyba |
| 4,817,551 | A | | 4/1989 | Matson |
| 5,205,803 | A | * | 4/1993 | Zemitis ...................... 482/121 |
| 5,317,788 | A | | 6/1994 | Esposito et al. |
| 5,546,639 | A | | 8/1996 | Lacore et al. |
| 5,607,736 | A | * | 3/1997 | Williams ................... 428/36.3 |
| 5,638,584 | A | | 6/1997 | De Anfrasio |
| 5,816,458 | A | | 10/1998 | Yonenoi |
| 6,085,628 | A | | 7/2000 | Street et al. |

OTHER PUBLICATIONS

Brochure for "Robby GLantz International Power Skating" schools and clinics for 1995, p. 1, picture entitled, "Bungie Côrds!".
Catalogue for Sportime 1993 Fall/Winter edition, p. 23,"Buddy Band".
Web site: http://www.speedster.com/hockey.htm, Sep. 17, 1996, pp. 1–3, prepared by Mark Goede for Greater Performance, Inc.

* cited by examiner

*Primary Examiner*—Robert J. Sandy (57) ABSTRACT

The present invention provides a unique safety sleeve elastic device having an elastic member of a certain longitudinal length. The elastic member provides stretching capability of up to seven times the elastic member's original length depending on the material selected. A flexible sleeve member is disposed around the elastic member. The sleeve member is less elastic than the elastic member and provides a stretch limitation to the elastic member to prevent a user from stretching the elastic member beyond a safe elongation. The ends of the sleeve and elastic members are secured proximate to one another. The ends of the elastic members are further secured to connectors. The elastic member provides stretch capability while the sleeve member provides safety features to protect the elastic member and the user.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 4, 10 and 14 are cancelled.

Claims 1, 5, 6, 7, 8, 9, 11, 12, 13 and 15–17 are determined to be patentable as amended.

New claims 18–74 are added and determined to be patentable.

1. A stretchable apparatus, comprising:
    an elastic member having first and second ends and configured to have a stretch of at least twice an original length;
    a flexible sleeve member having first and second ends and disposed around the elastic member in a loose-fitting configuration, wherein the sleeve member is configured with an elasticity less than the elastic member to thereby provide a stretch limitation to the elastic member; and
    first and second connectors secured to corresponding first and second ends of the elastic member, the first and second connectors further secured to corresponding first and second ends of the sleeve member; and
    *wherein the first end of the elastic member extends around at least a portion of the first connector, and wherein the elastic member comprises an aperture proximate the first end, the elastic member being configured to thread through the aperture to thereby connect the elastic member to the first connector.*

5. [The] *A stretchable* apparatus [of claim 1], *comprising:*
    *an elastic member having first and second ends and configured to have a stretch of at least twice an original length;*
    *a flexible sleeve member having first and second ends and disposed around the elastic member in a loose-fitting configuration, wherein the sleeve member is configured with an elasticity less than the elastic member to thereby provide a stretch limitation to the elastic member; and*
    *first and second connectors secured to corresponding first and second ends of the elastic member, the first and second connectors further secured to corresponding first and second ends of the sleeve member; and*
    wherein the sleeve member comprises a spiral member disposed substantially along the longitudinal length of the sleeve member.

6. [The] *A stretchable* apparatus [of claim 1], *comprising:*
    *an elastic member having first and second ends and configured to have a stretch of at least twice an original length;*
    *a flexible sleeve member having first and second ends and disposed around the elastic member in a loose-fitting configuration, wherein the sleeve member is configured with an elasticity less than the elastic member to thereby provide a stretch limitation to the elastic member; and*
    *first and second connectors secured to corresponding first and second ends of the elastic member, the first and second connectors further secured to corresponding first and second ends of the sleeve member; and*
    wherein the first connector comprises a base having an aperture through which the elastic member passes, wherein the first end of the elastic member is configured into a knot having a cross-section larger than the aperture to thereby prevent passage of the knot through the aperture.

7. [The] *A stretchable* apparatus [of claim 1], *comprising:*
    *an elastic member having first and second ends and configured to have a stretch of at least twice an original length;*
    *a flexible sleeve member having first and second ends and disposed around the elastic member in a loose-fitting configuration, wherein the sleeve member is configured with an elasticity less than the elastic member to thereby provide a stretch limitation to the elastic member; and*
    *first and second connectors secured to corresponding first and second ends of the elastic member, the first and second connectors further secured to corresponding first and second ends of the sleeve member; and*
    wherein the first connector comprises:
    a base having an aperture through which the elastic member passes; and
    a collar disposed around the elastic member and having a diameter larger than the aperture to thereby prevent passage of the collar through the aperture.

8. [The] *A stretchable* apparatus [of claim 1], *comprising:*
    *an elastic member having first and second ends and configured to have a stretch of at least twice an original length;*
    *a flexible sleeve member having first and second ends and disposed around the elastic member in a loose-fitting configuration, wherein the sleeve member is configured with an elasticity less than the elastic member to thereby provide a stretch limitation to the elastic member; and*
    *first and second connectors secured to corresponding first and second ends of the elastic member, the first and second connectors further secured to corresponding first and second ends of the sleeve member; and*
    wherein the first connector comprises:
    a rigid object disposed within the elastic member proximate to the first end of the elastic member, wherein the rigid object has a diameter greater than an internal diameter of the elastic member; and
    an end member having an aperture through which the elastic member passes, wherein the diameter of the elastic member at the location of the rigid object is greater than the aperture to thereby prevent passage of the rigid object through the aperture.

9. [The] *A stretchable* apparatus [of claim 1], *comprising:*
    *an elastic member having first and second ends and configured to have a stretch of at least twice an original length;*
    *a flexible sleeve member having first and second ends and disposed around the elastic member in a loose-fitting* configuration, wherein the sleeve member is configured
with an elasticity less than the elastic member to
thereby provide a stretch limitation to the elastic member; and first and second connectors secured to corresponding first
and second ends of the elastic member, the first and
second connectors further secured to corresponding
first and second ends of the sleeve member; and wherein the first connector comprises:

a base member at least partially disposed within the
elastic member proximate to the first end of the elastic
member, wherein the base member has a diameter
greater than an internal diameter of the elastic member;
and an attachment member connected to the base member.

11. [The] *A stretchable* apparatus [of claim 1], *comprising:*

*an elastic member having first and second ends and
configured to have a stretch of at least twice an original
length;*

*a flexible sleeve member having first and second ends and
disposed around the elastic member in a loose-fitting
configuration, wherein the sleeve member is configured
with an elasticity less than the elastic member to
thereby provide a stretch limitation to the elastic member; and*

*first and second connectors secured to corresponding first
and second ends of the elastic member, the first and
second connectors further secured to corresponding
first and second ends of the sleeve member; and* wherein the first connector comprises an attachment
member, wherein the first end of the elastic member
extends around a portion of the attachment member,
and wherein the elastic member is configured with an
aperture proximate to the first end, the elastic member
further configured to thread through the aperture to
thereby secure the connection of the elastic member to
the attachment member.

12. [The] *A stretchable* apparatus [of claim 1], *comprising:*

*an elastic member having first and second ends and
configured to have a stretch of at least twice an original
length;*

*a flexible sleeve member having first and second ends and
disposed around the elastic member in a loose-fitting
configuration, wherein the sleeve member is configured
with an elasticity less than the elastic member to
thereby provide a stretch limitation to the elastic member; and*

*first and second connectors secured to corresponding first
and second ends of the elastic member, the first and
second connectors further secured to corresponding
first and second ends of the sleeve member; and* wherein the first connector comprises:

a base member at least partially disposed within the
elastic member proximate to the first end of the elastic
member, wherein the base member has a diameter
greater than an internal diameter of the elastic member;

a first attachment member connected to the base member;

a strap having first and second ends, wherein the first end
of the strap is secured to the first attachment member;
and a second attachment member is secured to the second end
of the strap.

13. A method for producing a stretchable apparatus,
comprising:

providing an elastic member having first and second ends
and configured to have a stretch of at least twice an
original length;

disposing a loose-fitting, flexible sleeve member having
first and second ends around the elastic member,
wherein the sleeve member has an elasticity less than
the elastic member to thereby provide a stretch limitation;

securing first and second connectors to the respective first
and second ends of the elastic member; and securing the first and second ends of the sleeve member
to the first and second connectors; *and*

*wherein securing the first end of the elastic member to the
first connector comprises selecting a first connector
having an opening formed therein, passing the first end
of the elastic member through the opening, and disposing an object within the elastic member proximate
the first end of the elastic member to thereby prevent the
passage of the object through the opening.*

15. [The] *A* method [of claim 13] *for producing a stretchable apparatus, comprising:*

*providing an elastic member having first and second ends
and configured to have a stretch of at least twice an
original length;*

*disposing a loose-fitting, flexible sleeve member having
first and second ends around the elastic member,
wherein the sleeve member has an elasticity less than
the elastic member to thereby provide a stretch limitation;*

*securing first and second connectors to the respective first
and second ends of the elastic member; and*

*securing the first and second ends of the sleeve member to
the first and second connectors; and* wherein the step of securing the first and second connectors comprises inserting a portion of the first and
second connectors into the interior of the elastic member.

16. A stretchable apparatus, comprising:

an elastic member having first and second ends and
configured to have a stretch of at least twice an original
length;

a flexible sleeve member having first and second ends and
disposed around the elastic member in a loose-fitting
configuration, wherein the sleeve member is configured
with an elasticity less than the elastic member to
thereby provide a stretch limitation to the elastic
member, the first and second ends of the sleeve member
secured to the elastic member proximate to the corresponding first and second ends of the elastic member;
and first and second connectors secured to corresponding first
and second ends of the elastic member; *and*

*wherein the first connector is selected from the group
consisting of:*

*a connector comprising a base having an opening
through which the elastic member passes, and
wherein the first end of the elastic member is configured into a knot having a cross section larger than
the opening to thereby prevent passage of the knot
through the opening;*

*a connector having an opening through which the first
end of the elastic member passes, and having a
collar disposed around the elastic member proxi-* mate the first end to thereby prevent passage of the collar through the opening;
a connector having an opening through which the elastic member passes, and further comprising an object disposed within the elastic member proximate the first end of the elastic member to thereby prevent passage of the object through the opening;
a connector having a base portion at least partially disposed within the elastic member proximate to the first end of the elastic member, wherein the base portion has a diameter greater than the internal diameter of the first end of the elastic member, and wherein the connector further comprises an attachment portion connected to the base portion; and
a connector, wherein the elastic member has an opening formed proximate the first end of the elastic member, and wherein the first end of the elastic member is disposed at least partially around the connector, and wherein the second end of the elastic member is passed through the opening to thereby secure the elastic member to the connector.

17. A method for producing a stretchable apparatus, comprising:
providing an elastic member having first and second ends and configured to have a stretch of at least twice an original length;
disposing a loose-fitting, flexible sleeve member having first and second ends around the elastic member, wherein the sleeve member has an elasticity less than the elastic member to thereby provide a stretch limitation;
securing the first and second ends of the sleeve member to the elastic member proximate to the corresponding first and second ends of the elastic member; and
securing first and second connectors to the respective first and second ends of the elastic member; and
wherein the securing the first connector to the first end of the elastic member comprises selecting a first connector from the group consisting of:
a connector comprising a base having an opening through which the elastic member passes, and wherein the first end of the elastic member is configured into a knot having a cross section larger than the opening to thereby prevent passage of the knot through the opening;
a connector having an opening through which the first end of the elastic member passes, and having a collar disposed around the elastic member proximate the first end to thereby prevent passage of the collar through the opening;
a connector having an opening through which the elastic member passes, and further comprising an object disposed within the elastic member proximate the first end of the elastic member to thereby prevent passage of the object through the opening;
a connector having a base portion at least partially disposed within the elastic member proximate to the first end of the elastic member, wherein the base portion has a diameter greater than the internal diameter of the first end of the elastic member, and wherein the connector further comprises an attachment portion connected to the base portion; and
a connector, wherein the elastic member has an opening formed proximate the first end of the elastic member, and wherein the first end of the elastic member is disposed at least partially around the connector, and wherein the second end of the elastic member is passed through the opening to thereby secure the elastic member to the connector.

18. The apparatus of claim 6, wherein the first connector comprises a strap.

19. The apparatus of claim 18, wherein the strap is connected so as to form a loop.

20. The apparatus of claim 6, wherein the flexible sleeve member passes through the aperture.

21. The apparatus of claim 6, further comprising an attachment mechanism configured for releasable attachment to a second object.

22. The apparatus of claim 21, wherein the attachment mechanism is part of the first connector.

23. The apparatus of claim 18, wherein the strap further comprises a grommet or eyelet placed in the aperture.

24. The apparatus of claim 6, wherein the first connector comprises a connecting portion attached to the base.

25. The apparatus of claim 24, wherein the connecting portion has a shape selected from the group consisting of a loop, a circle, and oval, a hook, and a polygon.

26. The apparatus of claim 6, further comprising a strap attached to the first connector.

27. The apparatus of claim 6, further comprising a second connector attached to the first connector.

28. The apparatus of claim 7, wherein the first connector comprises a strap.

29. The apparatus of claim 28, wherein the strap is connected so as to form a loop.

30. The apparatus of claim 7, wherein the first connector further comprises an eyelet or grommet placed in the aperture.

31. The apparatus of claim 7, further comprising an attachment mechanism configured for releasable attachment to a second object.

32. The apparatus of claim 7, wherein the flexible sleeve member passes through the aperture.

33. The apparatus of claim 7, wherein the first connector further comprises a connecting portion attached to the base.

34. The apparatus of claim 7, further comprising a strap attached to the first connector.

35. The apparatus of claim 7, further comprising a second connector attached to the first connector.

36. The apparatus of claim 8, wherein the rigid object is spherical.

37. The apparatus of claim 8, wherein the rigid object has a generally circular cross section.

38. The apparatus of claim 8, wherein the first connector comprises a strap.

39. The apparatus of claim 38, wherein the strap is connected so as to form a loop.

40. The apparatus of claim 8, wherein the flexible sleeve passes through the aperture.

41. The apparatus of claim 8, further comprising an attachment mechanism configured for releasable attachment to a second object.

42. The apparatus of claim 38, wherein the flexible sleeve is attached to the strap.

43. The apparatus of claim 8, wherein the first connector comprises a base portion and a connecting portion, and wherein the aperture is formed in the base portion.

44. The apparatus of claim 43, wherein the connecting portion has a shape selected from the group consisting of a hook, a loop, a circle, an oval, and a polygon.

45. The apparatus of claim 8, further comprising a strap attached to the first connector.

46. The apparatus of claim 8, further comprising a second connector attached to the first connector.

47. The apparatus of claim 46, wherein the second connector is attached to the first connector via a strap.

48. The apparatus of claim 9, further comprising an attachment mechanism configured for releasable attachment to a second object.

49. The apparatus of claim 9, wherein the base member has a circular cross section.

50. The apparatus of claim 9, wherein the base member is elongate.

51. The apparatus of claim 9, wherein the attachment member has a shape selected from the group consisting of a hook, a loop, a circle, an oval, and a polygon.

52. The apparatus of claim 9, wherein the base member is cylindrical.

53. The apparatus of claim 1, wherein the first connector comprises a strap.

54. The apparatus of claim 53, wherein the strap is connected into a loop.

55. The apparatus of claim 1, wherein the first connector has a shape selected from the group consisting of a hook, a loop, a circle, an oval, and a polygon.

56. The apparatus of claim 1, further comprising a strap attached to the first connector.

57. The apparatus of claim 1, further comprising a second connector attached to the first connector.

58. The apparatus of claim 1, further comprising an attachment mechanism configured for releasable attachment to a second object.

59. The apparatus of claim 11, wherein the attachment member is a portion of the first connector configured for receiving the elastic member.

60. The apparatus of claim 11, wherein the first connector comprises a strap.

61. The apparatus of claim 11, wherein the first connector has a shape selected from the group consisting of a hook, a loop, a circle, an oval and a polygon.

62. The apparatus of claim 11, further comprising a strap attached to the connector.

63. The apparatus of claim 11, further comprising a second connector attached to the first connector.

64. The apparatus of claim 11, further comprising an attachment mechanism configured for releasable attachment to a second object.

65. The apparatus of claim 12, wherein the flexible sleeve is attached to the strap.

66. The method of claim 13, wherein the method further comprises passing the flexible sleeve through the opening.

67. The method of claim 13, wherein the first connector comprises a strap.

68. The method of claim 13, wherein the opening in the first connector further comprises an eyelet or grommet.

69. The method of claim 67, wherein the strap is connected into a loop.

70. The method of claim 13, wherein the elastic member at the location of the object is larger in diameter than the opening.

71. The method of claim 13, wherein the first connector comprises a base portion having the opening formed therein and a connector portion attached to the base portion.

72. A method for producing a stretchable apparatus, comprising:

providing an elastic member having first and second ends and configured to have a stretch of at least twice an original length;

disposing a loose-fitting, flexible sleeve member having first and second ends around the elastic member, wherein the sleeve member has an elasticity less than the elastic member to thereby provide a stretch limitation;

securing first and second connectors to the respective first and second ends of the elastic member; and securing the first and second ends of the sleeve member to the first and second connectors; and wherein securing the first end of the elastic member to the first connector comprises selecting an elastic member having an opening formed proximate the first end, disposing the first end of the elastic member around at least a portion of the first connector, and passing the second end of the elastic member through the opening to thereby secure the elastic member to the first connector.

73. The method of claim 72, wherein the first connector comprises a strap.

74. The method of claim 72, wherein the method further comprises attaching a strap to the first connector.

* * * * *